(12) United States Patent
Riesinger et al.

(10) Patent No.: US 7,222,876 B2
(45) Date of Patent: May 29, 2007

(54) DOOR LINING FOR A PRIVATE CAR, COMPRISING AN INTEGRATED LATERAL AIRBAG MODULE

(75) Inventors: Stefan Riesinger, Wolfratshausen (DE); Dirk Dyckerhoff, Penzberg (DE)

(73) Assignee: Findlay Industries Deutschland GmbH, Geretsried (DE)

( * ) Notice: Subject to any disclaimer, the term of this patent is extended or adjusted under 35 U.S.C. 154(b) by 373 days.

(21) Appl. No.: 10/482,648

(22) PCT Filed: Jul. 17, 2002

(86) PCT No.: PCT/EP02/07939

§ 371 (c)(1),
(2), (4) Date: Jun. 14, 2004

(87) PCT Pub. No.: WO03/011657

PCT Pub. Date: Feb. 13, 2003

(65) Prior Publication Data

US 2004/0212178 A1 Oct. 28, 2004

(30) Foreign Application Priority Data

Jul. 21, 2001 (DE) ................................ 101 35 614

(51) Int. Cl.
*B60R 21/20* (2006.01)
(52) U.S. Cl. ............................ 280/728.3; 280/728.2; 280/730.2
(58) Field of Classification Search ............ 280/728.1, 280/730.2, 728.3, 732, 728.2
See application file for complete search history.

(56) References Cited

U.S. PATENT DOCUMENTS

| | | | | | |
|---|---|---|---|---|---|
| 6,106,005 | A | * | 8/2000 | Heinz et al. ............. | 280/730.2 |
| 6,237,934 | B1 | * | 5/2001 | Harrell et al. ........... | 280/728.3 |
| 6,508,486 | B1 | * | 1/2003 | Welch et al. ............ | 280/730.2 |
| 2004/0119267 | A1 | * | 6/2004 | Cowelchuck et al. .... | 280/728.3 |

FOREIGN PATENT DOCUMENTS

| | | | |
|---|---|---|---|
| DE | 43 44 523 | A1 | 7/1995 |
| DE | 195 30 346 | A1 | 2/1996 |
| DE | 195 05 214 | A1 | 8/1996 |
| DE | 195 16 230 | A1 | 11/1996 |
| DE | 196 40 434 | A1 | 4/1997 |
| DE | 196 51 758 | A1 | 6/1997 |
| DE | 196 46 548 | A1 | 5/1998 |
| DE | 197 20 585 | A1 | 11/1998 |
| DE | 101 04 036 | A1 | 8/2001 |
| DE | 10104036 | A1 * | 8/2001 |
| EP | 0 949 124 | A2 | 10/1999 |
| EP | 0 968 889 | A1 | 1/2000 |

* cited by examiner

*Primary Examiner*—Paul N. Dickson
*Assistant Examiner*—Tiffany L. Webb
(74) *Attorney, Agent, or Firm*—Venable LLP; Thomas G. Wiseman

(57) ABSTRACT

The present invention relates to a door trim part with a lateral airbag module for a passenger car the support part of which is provided with a lateral impact protection in the form of an airbag.

18 Claims, 4 Drawing Sheets

DOOR LINING FOR A PRIVATE CAR, COMPRISING AN INTEGRATED LATERAL AIRBAG MODULE

BACKGROUND OF THE INVENTION

1. Field of the Invention

The present invention relates to a door trim part with a lateral airbag module for a passenger car the support part of which is provided with a lateral impact protection in the form of an airbag.

2. Description of Related Art

DE 19516230 A1 relates to an airbag cover, in particular, for an airbag as protection against head-on and side on collision in a motor vehicle, with a molding which covers the airbag operating means as well as the airbag collision cushion and which comprises predetermine break points which on release of the airbag can be broken open by the airbag collision cushion and ensure exit of the airbag collision cushion, and a visible covering which covers the molding and which comprises partial reductions in material thickness extending in the region of the predetermined break points of the molding. In addition, the invention relates to the use of such an air bag cover, a method of manufacture of a visible covering for an airbag cover, and a template for use in a method for the manufacture of a visible covering for an airbag cover.

DE 195 05 214 A1 relates to an interior trim part for a side door of a passenger car, which door is provided with side impact protection in the form of an airbag which is arranged in a recess in the interior trim part, characterized in that a funnel edge being provided in an exit region of the recess for the forced guidance of the airbag, and that the recess is covered by a foam molding which is provided with a predetermined break line running across the recess intermediate two opposed sides, and which molding is covered, towards the interior of the vehicle, by means of an integral decorative skin connected fixedly to the interior paneling part and is divided in two at the line of the predetermined break line, the two parts of the decorative skin being joined together by means of a seam which rips open when the airbag is activated.

The above mentioned prior art has a common feature in that the predetermined break line of the decorative layer is visible more or less clearly from the interior of the vehicle.

DE 4344523 A1 relates to a covering member for an airbag accommodation chamber which is covered in the region of its passenger-facing side and will open to allow an inflatable cushion to pass. The core of the invention resides in the fact that at least one skin-like member having a predetermined material thickness is to be used as said covering member and said skin-like member has a smaller cross-section at the airbag side at least along a line on its back side towards cushion.

BRIEF SUMMARY OF THE INVENTION

Therefore, it has been the object of the present invention to provide a door trim part for a passenger car the support part of which is provided with a lateral impact protection in the form of an airbag, wherein the fact that a lateral impact protection in the form of an airbag is concealed in the region of the decorative layer cannot be seen from the interior of the vehicle. It has been another object of the invention to provide a safe attachment of the parts of the airbag cover detached when the airbag unfolds. A further object of the invention has been to improve the grip properties in the region of the airbag module in such terms that no visible or palpable weaknesses of the constructional part are present at the surface.

BRIEF DESCRIPTION OF THE DRAWING

FIG. 4 shows a preferred embodiment of holding elements 8, 8a.

DETAILED DESCRIPTION OF THE INVENTION

Figure 1A:
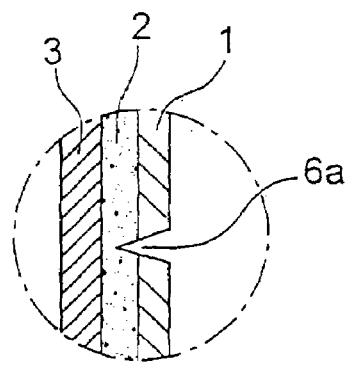
FIGS. 1a and b show preferred embodiments of the invention.

According to the present invention, the above object is achieved by a door trim part with a lateral airbag module for a passenger car, consisting of a support part 1, a foam sheet 2 firmly bonded therewith, and a decorative layer 3 firmly bonded to said foam sheet 2, and a decorative layer 3 firmly bonded to said foam sheet 2, provided with a lateral impact protection in the form of an airbag, characterized in that said support part 1 substantially completely covers the region of the recess 4 and has a least one predetermined break line 6 which extends at a level midway over the recess 4, wherein the door trim part has one or more flexible holding members 8, 8a which are, separately, connected, on the one hand, with support part 1 or an interior metal panel of the side door and, on the other hand, with respective segments of the support part 1 in the region of recess 4.

Figure 1B:
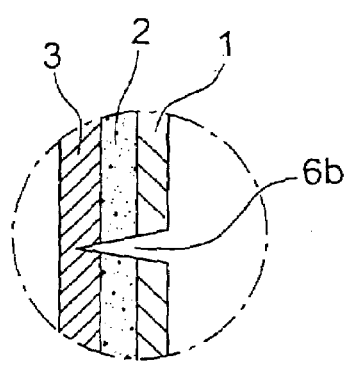
FIG. 1 shows intact interior trim part.
Figure 1:
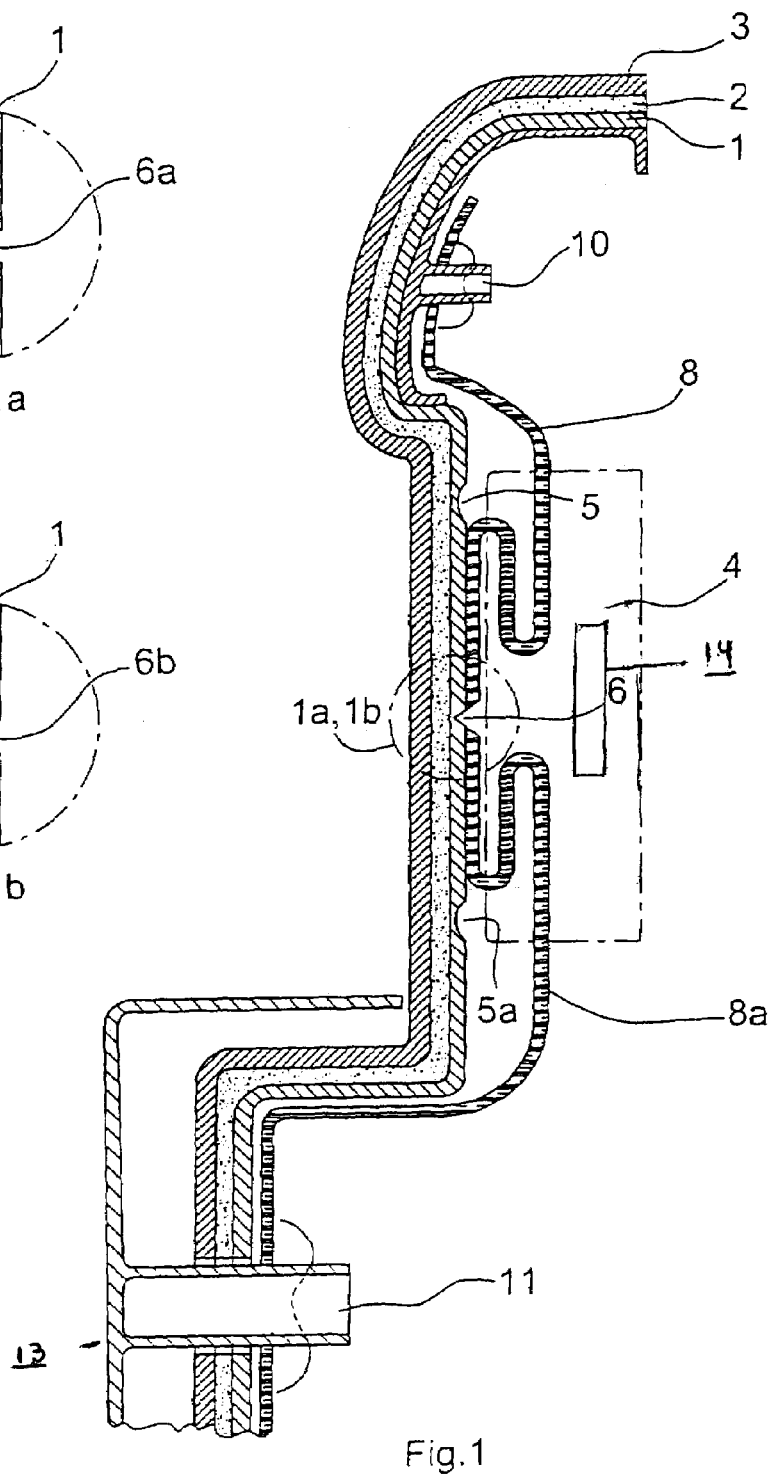

As shown in FIG. 1, by closing the recess by means of the support part 1 and the foam sheet 2 which extends over a substantial area of the recess of the lateral impact protection, the airbag unit is covered virtually completely by the dimensionally stable support part 1. The foam sheet 2 is in turn completely covered by the integral decorative layer 3, so that an optically uniform appearance is provided for the door trim part.

Because of the predetermined break line 6, 6a, 6b provided on the back side of the support part 1 and optionally on the foam sheet 2 and the decorative layer 3, this line will rip when the airbag is activated and ensures the function of the air bag unit 14 as a lateral impact protection. In contrast to prior art in which the entire recess of the lateral airbag is provided with a circumferential predetermined break line, large-area shreds of the decorative layer 3 can be prevented from reaching the interior of the vehicle when the air bag 14 is activated. The hinge functions 5,5a secure the detachment of parts of the cover and promote the precise opening through the lateral airbag 14 as shown in FIG. 2.

However, in case portions of decorative layer 3 or foam sheet 2 including the support part 1 should be completely detached, these are prevented from entering the interior of the vehicle by holding members 8 or 8a.

FIGS. 1a and 1b show preferred embodiments of the invention. When the predetermined break line 6a of the foam sheet 2 and an additional predetermined break line 6b of decorative layer 3 are present in congruence with predetermined break line 6 of the support part 1, the compression forces produced upon activation of the airbag can be directed in such a way that the decorative layer 3 including foam sheet 2 rips open about midway between top and bottom. It is particularly advantageous to design the predetermined break lines 6, 6a, 6b to rip open over the entire length of the recess, while support parts 1 remain firmly bonded to decorative layer 3 through foam sheet 2.

Figure 2:
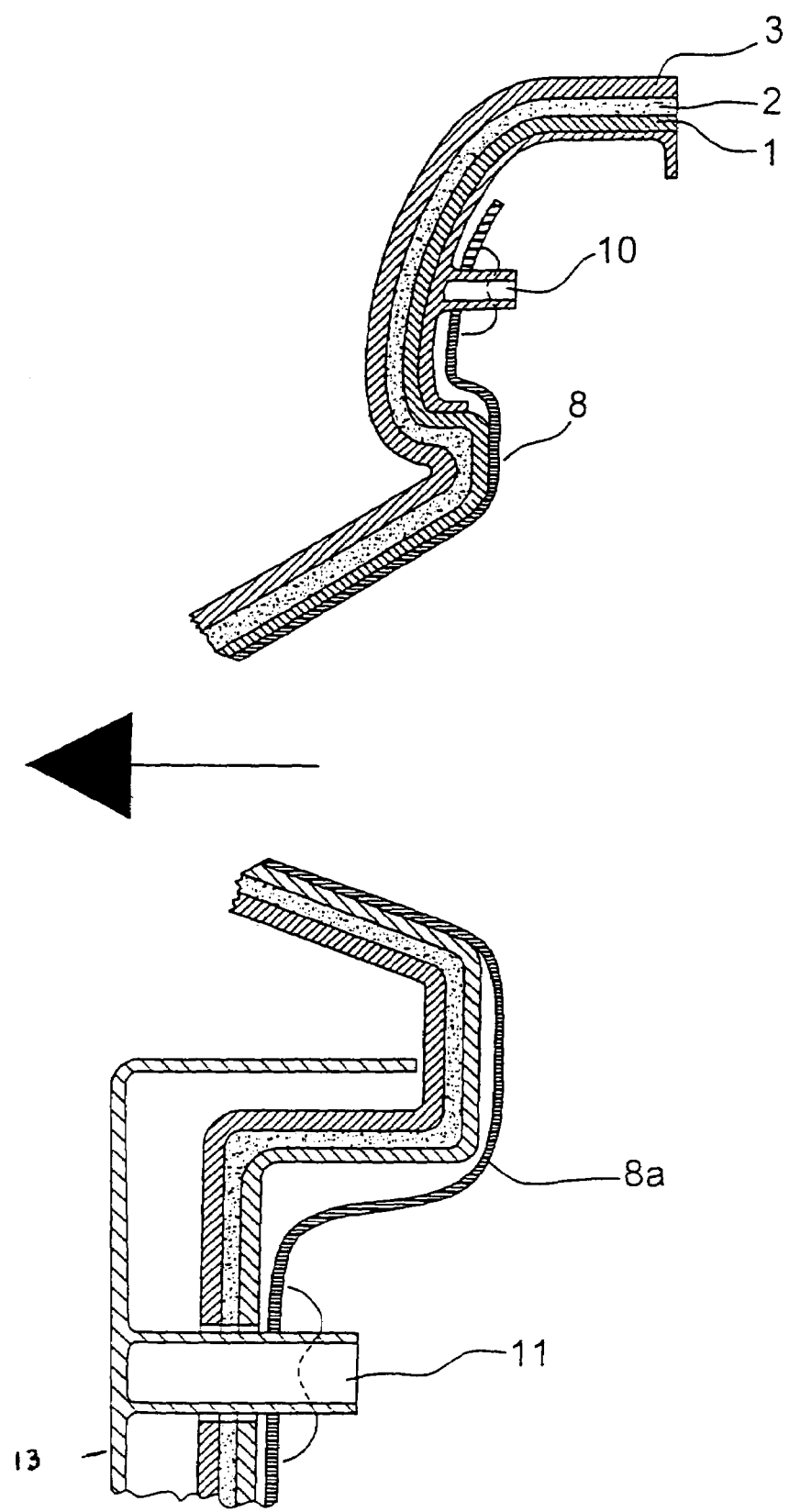
FIG. 2 shows a corresponding trim part after the airbag has opened.

FIG. 2 shows a corresponding interior trim part after the airbag has been opened, the predetermined break line 6 of support part 1 having been torn open. The foam sheet 2 positioned above has also been torn open. Decorative layer 3 will also rip open only at the predetermined break line 6b, so that the portions of decorative layer 3 covering the recess 4 remain in place.

In a preferred embodiment of the present invention, support part 1 is made of natural-fiber reinforced epoxy resin or natural-fiber reinforced polyurethane, an injection-molded part or a natural-fiber reinforced polypropylene. Thus, support part 1 is prepared from materials per se known in the prior art.

Figure 3:
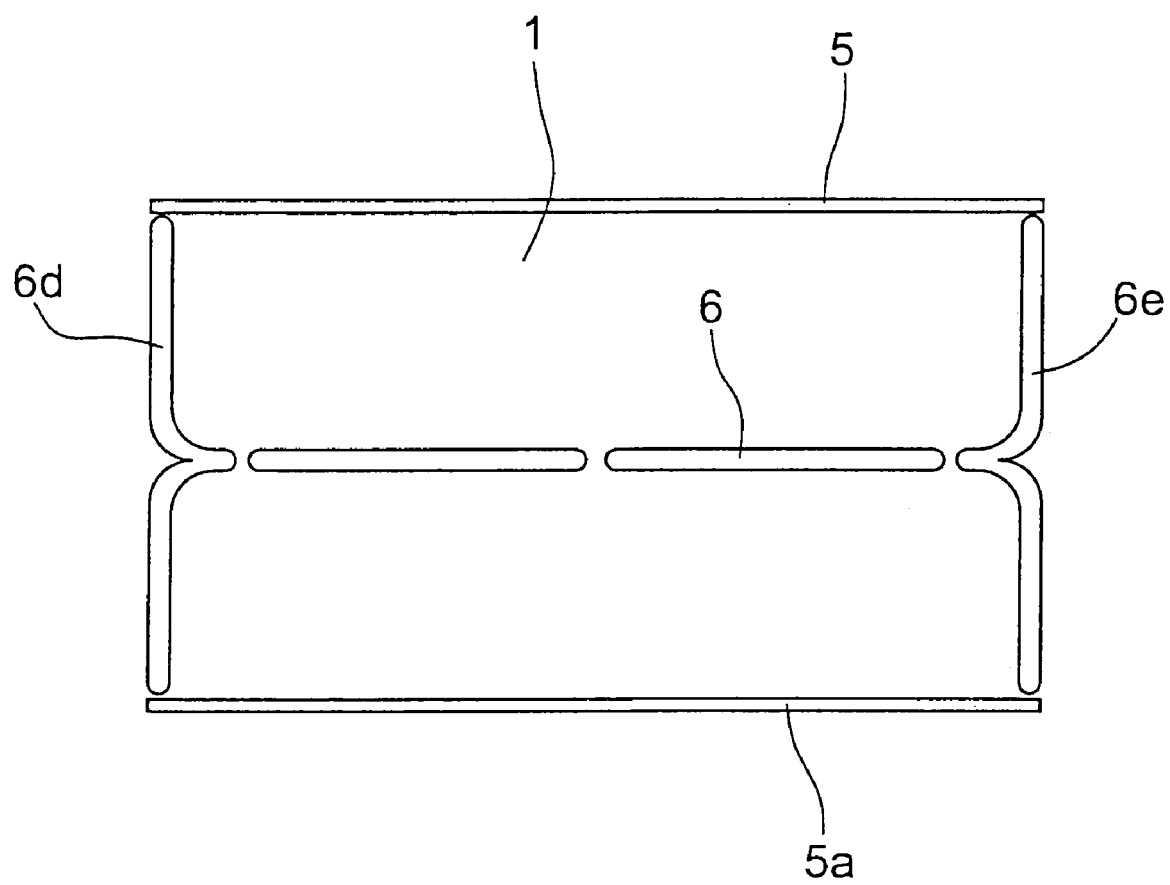
FIG. 3 shows a corresponding interior trim part with three predetermined break lines.

As shown in FIG. 3, the support part 1 preferably has three predetermined break lines 6, 6d, 6e. While the predetermined break line 6 divides the recess approximately midway along the hinges 5, 5a, it is particularly preferred to have the predetermined break lines 6d and 6e running along the upper and lower edges of the hinges 5, 5a. The same is true of predetermined break lines 6d and 6e of support part 1 which have also been torn open and thus enable the airbag to exit out of a large area. The predetermined break lines 6, 6d, 6e and the hinges 5, 5a can be produced by milling the support part 1. The foam sheet 2 and the decorative layer 3 need not be weakened since a defined ripping of decorative layer 3 is achieved by the edges of the flaps of support part 1 which are positioned immediately underneath the decorative layer 3. This causes significant advantages with respect to visibility and reduction of thickness of the decorative layer.

It is particularly preferred according to the present invention that the foam sheet 2 provided two-dimensionally over the support part I be made of a polyurethane (PUR), polypropylene (PP), and/or polyethylene (PE) foam the hardness of which can be adjusted depending on manufacturing conditions.

A wide variety of materials can be used as the decorative layer 3, especially plastic sheet (compact sheets, slush-molded, cast and sprayed skins), natural leather and/or artificial leather. A fabric material can be employed directly by means of the present invention and does not necessarily require an intermediate layer between the foam sheet 2 and the decorative layer 3.

As set forth above, the decorative layer 3 has a predetermined break line 6 which runs at a level midway over the recess.

As known in the prior art, the lateral airbag is preferably subject to forced guidance in a funnel of the door trim part for a defined exit from support part 1 into the interior of the vehicle at the level of the recess. In particular, the lateral airbag is accommodated in an airbag housing, not shown in the Figures. In this respect, DE 195 05 214 A1 is included herein by reference in its entirety since this technology can also be employed in the present invention. According to the invention, the airbag unit comprising the airbag can be attached by weld joints or positively locked by insertion. This results in a low mounting expenditure for the automobile manufacturer. In addition, functional advantages arise since no pulsation effects occur, as occur in systems of the prior art in which the airbag is attached to the interior door panel. In this case, the trim tends to pump which causes a risk of unintentional activation (airbag unfolding behind the trim). In addition, the system speed is increases according to the invention.

An essential safety element of the present invention is seen in the flexible holding members 8, 8a represented in FIGS. 1, 2 and 3, which are, separately, connected with support part 1 on both sides of the hinges 5, 5a or, on the one hand, with an interior metal panel of the side door (not shown) and, on the other hand, with respective segments of the support part 1 in the region of recess 4, the holding members 8, 8a optionally being separated by a predetermined break line 6. This embodiment according to the invention prevents pieces of support part 1, foam sheet 2 and/or decorative layer 3 from entering the interior of the vehicle when the airbag is activated. The holding members 8, 8a may also be integral and connected with support part 1. The separation is effected, for example, during the milling/weakening process of the support part 1, in which the support part 1, the holding members 8, 8a and optionally the foam sheet 2 as well as the decorative layer 3 are separated or weakened with a milling tool.

For attaching the holding members 8, 8a on the vehicle side, there are several possibilities. In a preferred embodiment of the present invention, the holding members 8, 8a are embodies in support part 1 by reshaped welding domes 10, 11 or by means of metal/plastic screws or spring washers attached in domes 10, 11. Alternatively, of course, it is also possible to attach these holding members 8, 8a directly to an interior metal panel of the side door 13.

Figure 4:
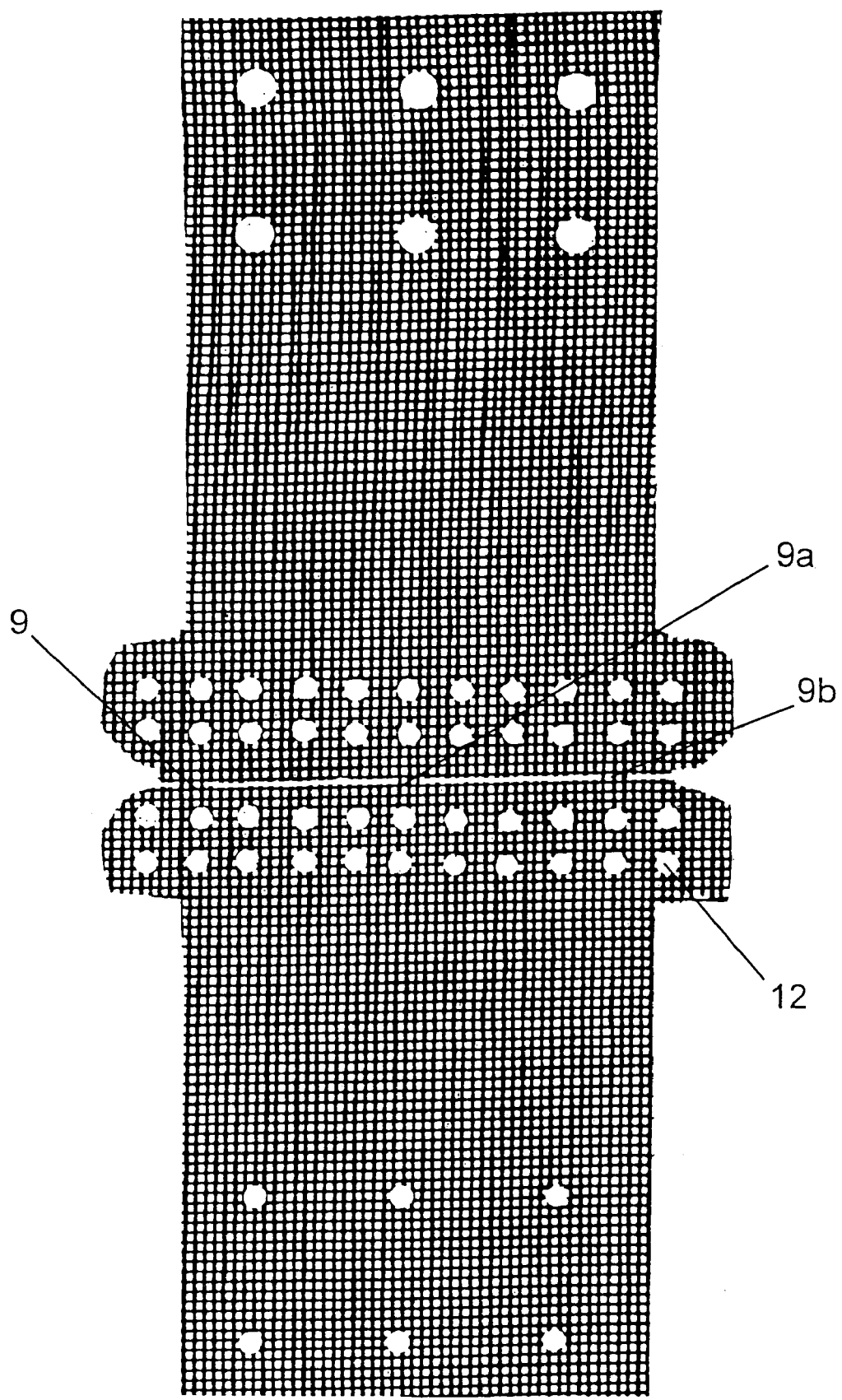

Within recess 4 and hinges 5, 5a, it is particularly preferred according to the present invention to connect, for example, bond or weld, the holding members 8, 8a directly with the support part 1. FIG. 4 shows a preferred embodiment of holding elements 8, 8a. To be able to serve their function, the holding members 8, 8a should have a certain flexibility. Accordingly, it is particularly preferred according to the present invention that these holding members 8, 8a be made of fabric strips, optionally with a perforated pattern 12, especially of polyamide, polyester or glass fiber. Such a material has sufficient flexibility to enable the recess area of the funnel edge to be opened as smoothly as possible. Then again, such a material has sufficient strength to prevent with certainty that any pieces of support part 1, foam sheet 2 or decorative layer 3 reach the interior of the vehicle. To improve the adjusting accuracy of the positioning of holding members 8 and 8a on the support part 1, it is particularly preferred according to the present invention to interconnect the holding members 8 and 8a through one or more tear-up bridges 9, 9a or 9b. The tear-up bridges 9, 9a, 9b practically run along the predetermined break line 6 so that the position of the line forming when the airbag unfolds should be in congruence with predetermined break line 6.

The advantage of the perforated pattern 12 resides, in particular, in the improved bonding and the thus improved adhesion to the support part 1.

In an embodiment not shown in the Figures, the interior metal panel of the side door, the airbag unit and the door trim part are fixed to one another through one or more attachment points so that the airbag unit is prevented from detaching even under high stresses, such as a lateral impact with a high degree of deformation of the side door, and a reliable activation of the airbag is ensured.

The invention claimed is:

1. A door trim part with a lateral airbag module for a passenger car, consisting of a support part (1), foam sheet (2) and a decorative layer (3), wherein said support part (1) completely covers a recess (4) containing the lateral airbag module, has attachment points for holding members (8, 8a), and has at least one predetermined break line (6) which extends at a level midway over the recess (4), wherein the foam sheet (2) is firmly bonded with the support part (1) and the decorative layer (3) and one or more flexible holding members (8, 8*a*) made of fabric strips which are, separately connected with the support part (1) or an interior metal panel of the side door (13) and with respective segments of the support part (1) in the region of the recess (4).

2. The door trim part according to claim 1, wherein said support part (1) comprises natural-fiber reinforced epoxy resin, polyurethane, or poly-propylene.

3. The door trim part according to claim 1 or 2, wherein the foam sheet (2) comprises polypropylene (PP), polyethylene (PE) and/or polyurethane (PUR) foam.

4. The door trim part according to claim 1, wherein the decorative layer (3) comprises a plastic sheet.

5. The door trim according to claim 4, wherein the plastic sheet is a compact sheet.

6. The door trim part according to claim 1, wherein said support part (1) and foam sheet (2) have a predetermined break line (6*a*) which runs at a level midway over the recess (4).

7. The door trim part according to claim 6, wherein said predetermined break line (6*a*) is a groove or notch.

8. The door trim part according to claim 1, wherein said predetermined break line (6) comprises interruptions for stabilizing the surface.

9. The door trim part according to claim 8, wherein said attachment points for the holding members (8, 8*a*) are bonds or welds.

10. The door trim part according to claim 8, wherein said fabric strips comprise polyamide, polyester or glass fiber.

11. The door trim according to claim 8, wherein said holding members (8, 8*a*) are interconnected through one or more tear-up bridges (9, 9*a*, 9*b*).

12. The door trim part according to claim 11, wherein said tear-up bridges (9, 9*a*, 9*b*) are congruent with said predetermined break line (6).

13. The door trim part according to claim 8, wherein said holding members (8, 8*a*) have a perforated pattern (12).

14. The door trim part according to claim 1, wherein said attachment points of the holding members (8, 8*a*) in the support part (1) are formed by reshaped welding domes (10, 11) or by means of metal-plastic screws or spring washers attached in the domes (10, 11).

15. The door trim part according to claim 1, wherein the airbag module comprises said airbag and said support part (1), which are both attached to an interior metal panel of a side door through at least one attachment point.

16. The door trim part according to claim 1, wherein the airbag module comprises said airbag attached to support part (1).

17. The door trim according to claim 1 wherein the support part (1) comprises an injected molded part.

18. The door trim according to claim 1 wherein the decorative layer (3) is slush-molded, cast or spray skin or a natural or artificial leather.

* * * * *